(12) United States Patent
Shimizu et al.

(10) Patent No.: US 11,877,199 B2
(45) Date of Patent: Jan. 16, 2024

(54) BASE STATION MANAGEMENT METHOD, BASE STATION MANAGEMENT APPARATUS AND PROGRAM

(71) Applicant: NIPPON TELEGRAPH AND TELEPHONE CORPORATION, Tokyo (JP)

(72) Inventors: Takashi Shimizu, Tokyo (JP); Maiko Naya, Tokyo (JP); Kenji Shimizu, Tokyo (JP); Takahiro Yamazaki, Tokyo (JP); Atsushi Taniguchi, Tokyo (JP); Takayuki Yamada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 23 days.

(21) Appl. No.: 17/272,894

(22) PCT Filed: Aug. 23, 2019

(86) PCT No.: PCT/JP2019/032993
§ 371 (c)(1),
(2) Date: Mar. 2, 2021

(87) PCT Pub. No.: WO2020/054357
PCT Pub. Date: Mar. 19, 2020

(65) Prior Publication Data
US 2021/0219201 A1  Jul. 15, 2021

(30) Foreign Application Priority Data

Sep. 13, 2018  (JP) ................................ 2018-171693

(51) Int. Cl.
*H04W 36/10* (2009.01)
*H04W 36/30* (2009.01)
(Continued)

(52) U.S. Cl.
CPC ......... *H04W 36/10* (2013.01); *H04W 36/305* (2018.08); *H04W 88/10* (2013.01); *H04W 24/04* (2013.01)

(58) Field of Classification Search
CPC ... H04W 36/10; H04W 36/305; H04W 88/10; H04W 24/04
See application file for complete search history.

(56) References Cited

U.S. PATENT DOCUMENTS 5,894,063 A * 4/1999 Hutchens ............ H01J 49/0418
436/178
8,180,407 B1 * 5/2012 Kindred ............ H04W 52/0251
327/544
(Continued)

FOREIGN PATENT DOCUMENTS

WO  2014025296 A1 * 2/2014  ............ H04W 72/12

OTHER PUBLICATIONS

Takahiro Yamazaki et al., Integrated Management Architecture of Future IoT Wireless Access Systems-Wireless Access Virtualization-, IEICE Technical Report, MoNA2016-48 (Mar. 2017), vol. 116, No. 508, pp. 309-314.
(Continued)

*Primary Examiner* — Hassan A Phillips
*Assistant Examiner* — Prenell P Jones
(74) *Attorney, Agent, or Firm* — Harness, Dickey & Pierce, P.L.C.

(57) ABSTRACT

A base station information DB (11) of a base station management apparatus (1) stores base station information that indicates wireless schemes that can be implemented by base stations (5), scheduled periods for implementation of the wireless schemes, and coverage areas of the base stations (5) in which wireless terminals can be accommodated. A use base station selection unit (14) creates a list of base stations
(Continued)

(5) that can cover an entirety or part of a coverage area of a failed base station, which is a base station (5) that has failed, with reference to the base station information, selects a base station (5) that can implement an implementation-scheduled wireless scheme, which is a wireless scheme that is scheduled to be implemented by the failed base station, during a scheduled implementation period, which is the scheduled period for implementation of the implementation-scheduled wireless scheme of the failed base station, from among the base stations (5) included in the list, and sets the selected base station (5) so as to provide the implementation-scheduled wireless scheme to the coverage area of the failed base station during the scheduled implementation period.

11 Claims, 13 Drawing Sheets

(51) Int. Cl.
  *H04W 88/10* (2009.01)
  *H04W 24/04* (2009.01)

(56) References Cited

U.S. PATENT DOCUMENTS

| | | | | |
|---|---|---|---|---|
| 8,494,525 | B2* | 7/2013 | Nair | H04W 36/00835 |
| | | | | 455/442 |
| 9,542,240 | B2* | 1/2017 | Adachi | G06F 9/54 |
| 9,560,660 | B1* | 1/2017 | Oroskar | H04L 5/0044 |
| 2005/0003827 | A1* | 1/2005 | Whelan | H04W 16/10 |
| | | | | 455/454 |
| 2008/0064361 | A1* | 3/2008 | Bjork | H04W 24/04 |
| | | | | 455/403 |
| 2009/0221287 | A1* | 9/2009 | Balasubramanian | |
| | | | | H04W 8/005 |
| | | | | 455/434 |
| 2010/0159927 | A1* | 6/2010 | Toda | H04W 48/16 |
| | | | | 455/435.2 |
| 2011/0300873 | A1* | 12/2011 | Wen | H04W 72/54 |
| | | | | 455/450 |
| 2012/0190380 | A1* | 7/2012 | Dupray | G01S 1/028 |
| | | | | 455/456.1 |
| 2012/0222045 | A1* | 8/2012 | Adachi | G06F 9/54 |
| | | | | 719/313 |
| 2013/0053024 | A1* | 2/2013 | Zou | H04W 52/0206 |
| | | | | 455/424 |
| 2014/0233522 | A1* | 8/2014 | Tokairin | H04B 7/0619 |
| | | | | 370/329 |
| 2014/0369216 | A1* | 12/2014 | Tamaki | H04W 52/0229 |
| | | | | 370/252 |
| 2015/0065122 | A1* | 3/2015 | Futaki | H04W 24/04 |
| | | | | 455/424 |
| 2015/0201341 | A1* | 7/2015 | Nunokawa | H04W 24/08 |
| | | | | 455/67.13 |
| 2015/0236766 | A1* | 8/2015 | Papadopoulos | H04L 5/0053 |
| | | | | 370/329 |
| 2015/0282202 | A1* | 10/2015 | Miao | H04W 72/54 |
| | | | | 370/329 |
| 2015/0296450 | A1* | 10/2015 | Koo | H04W 48/16 |
| | | | | 455/435.3 |
| 2016/0057806 | A1* | 2/2016 | Wittberg | H04W 68/005 |
| | | | | 370/336 |
| 2016/0112942 | A1* | 4/2016 | Chang | H04B 7/0417 |
| | | | | 455/434 |
| 2016/0234830 | A1* | 8/2016 | Kim | H04L 5/00 |
| 2016/0338134 | A1* | 11/2016 | Nagasaka | H04W 36/08 |
| 2017/0026983 | A1* | 1/2017 | Murakami | H04W 72/12 |
| 2017/0055164 | A1* | 2/2017 | Santhanam | H04W 24/02 |
| 2017/0055170 | A1* | 2/2017 | Futaki | H04W 24/08 |
| 2018/0123772 | A1* | 5/2018 | Wang | H04L 5/1461 |
| 2018/0254860 | A1* | 9/2018 | Wong | H04L 1/1664 |
| 2018/0351668 | A1* | 12/2018 | Kim | H04L 27/2691 |
| 2019/0246329 | A1* | 8/2019 | Abouelmaati | H04W 36/165 |
| 2019/0246342 | A1* | 8/2019 | Wang | H04W 36/00835 |
| 2020/0137682 | A1* | 4/2020 | Jia | H04W 36/00837 |
| 2021/0092753 | A1* | 3/2021 | Choi | H04W 72/542 |

OTHER PUBLICATIONS

Hozumi Tamura, NTT DoCoMo disaster counter measures, online, Jun. 8, 2018 (retrieved on Aug. 20, 2018).

Ryuichi Takechi et al., Technology to Optimize Radio Access Networks: Self-Organizing Network (SON), Fujitsu, 62, 4, pp. 449-454, Jul. 2011.

* cited by examiner

FIG. 4

| LIST NUM-BER | BASE STATION NUMBER | BASE STATION POSITION | SUPPORTED WIRELESS SCHEMES | NUMBER OF WIRELESS SCHEMES THAT CAN BE MULTIPLEXED | WIRELESS SCHEME THAT IS CURRENTLY IMPLEMENTED | NUM-BER OF TERM-INALS ACCOM-MODATED | VOLUME OF TRAFFIC ACCOMMODATED | POSI-TIONS OF ACCOM-MODATED TERMINALS | SCHEDULE INFOR-MATION |
|---|---|---|---|---|---|---|---|---|---|
| 1 | 1 | $(x_1, y_1)$ | A, B, C | 2 | B | 10 | 50 Mbps | $(x_{T1}, y_{T1})$ : | XXX |
| 2 | 2 | $(x_2, y_2)$ | A, B, C | 2 | C | 20 | 1 Mbps | $(x_{T2}, y_{T2})$ : | XXX |
| 3 | 5 | $(x_3, y_3)$ | A, B | 1 | A | 10 | 30 Mbps | $(x_{T3}, y_{T3})$ : | XXX |
| 4 | 8 | $(x_4, y_4)$ | A, B | 1 | B | 5 | 5 Mbps | $(x_{T4}, y_{T4})$ : | XXX |

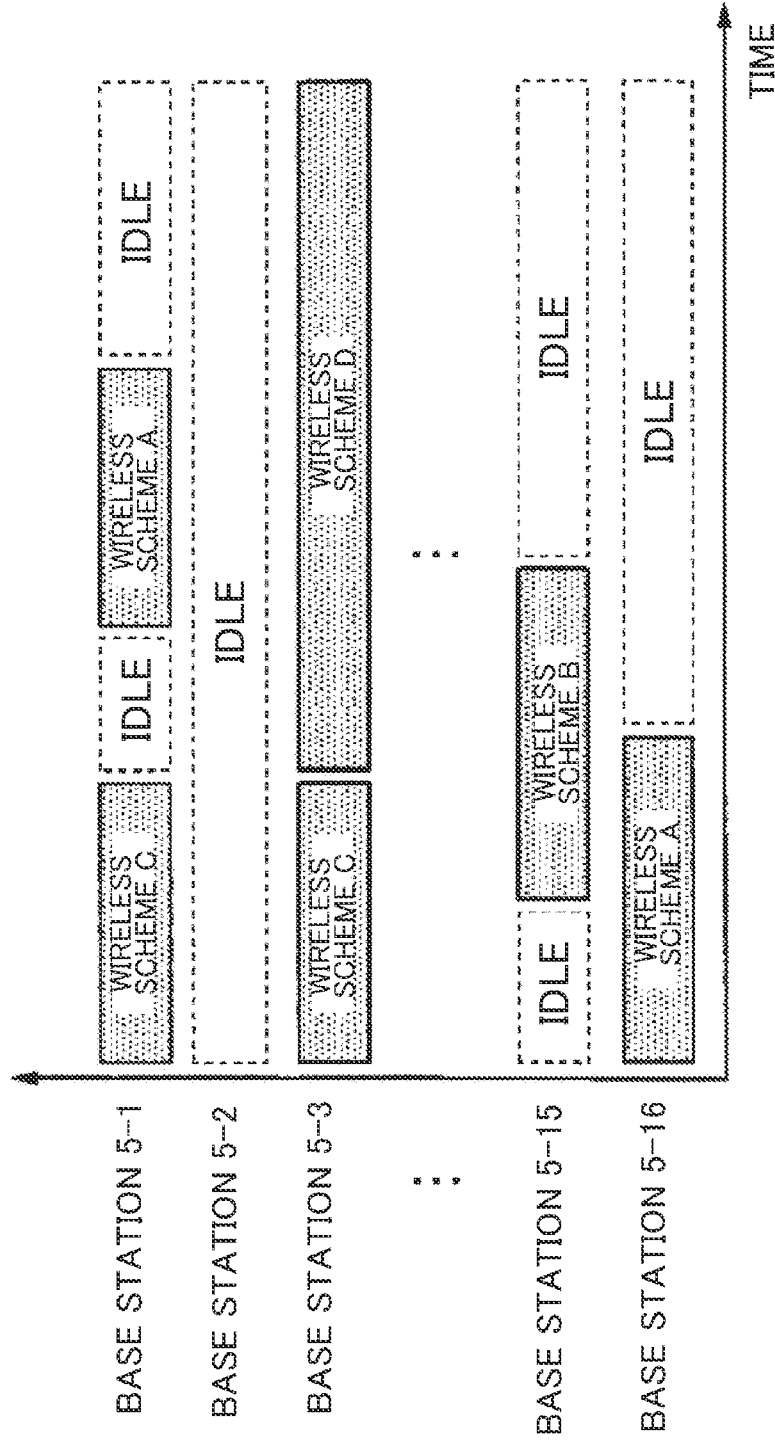

| FAILED BASE STATION NUMBER | WIRELESS SCHEME | BASE STATION POSITION |
|---|---|---|
| 3 | A | $(X_3, Y_3)$ |

(b)

| LIST NUMBER | BASE STATION NUMBER | WIRELESS SCHEME | BASE STATION POSITION |
|---|---|---|---|
| 1 | 1 | A | $(x_1, y_1)$ |
| 2 | 2 | A | $(x_2, y_2)$ |
| 3 | 5 | A | $(x_3, y_3)$ |
| 4 | 8 | A | $(x_4, y_4)$ |

BASE STATION MANAGEMENT METHOD, BASE STATION MANAGEMENT APPARATUS AND PROGRAM

CROSS-REFERENCE TO RELATED APPLICATIONS

This application is a 371 U.S. National Phase of International Application No. PCT/JP2019/032993 filed on Aug. 23, 2019, which claims priority to Japanese Application No. 2018-171693 filed on Sep. 13, 2018. The entire disclosures of the above applications are incorporated herein by reference.

TECHNICAL FIELD

The present invention relates to a base station management method, a base station management apparatus and a program.

BACKGROUND ART

In order to operate IoT (Internet of Things) services with various communication requirements, it is envisaged that software base stations that can implement a required wireless scheme when necessary will become widespread (for example, see NPL 1).

On the other hand, during operation of a service, a base station in operation may fail due to a disaster or the like. When a wireless service is stopped as a result of a base station failing due to a disaster or the like, the following means can be conceived of as examples of means for accommodating wireless terminals that are present in the coverage area of the base station that has failed (hereinafter also referred to as a failed base station). One means is to install a large zone base station that covers a wider area than an ordinary base station (for example, see NPL 2). Another means is a SON (Self-Organizing Network), which is formed by an adjacent base station, located near the failed base station, changing the antenna angle thereof to expand the cell (coverage area) thereof, thereby accommodating the wireless terminals in the cell (for example, see NPL 3).

CITATION LIST

Non Patent Literature

[NPL 1] Takahiro YAMAZAKI and three other authors, "Integrated Management Architecture of Future IoT Wireless Access Systems: Wireless Access Virtualization", The Institute of Electronics, Information and Communication Engineers, IEICE Technical Report, March 2017, vol. 116, no. 508, MoNA2016-48, pp. 309-314

[NPL 2] Hozumi Tamura, "*NTT Docomo no saigai taisaku* (NTT Docomo's Guidelines for Disaster Countermeasures)", [online], Jun. 8, 2018, NTT Docomo, Inc. [Searched on Aug. 20, 2018], Internet <http://www.bousai.go.jp/kaigirep/saigaijyouhouhub/dai5kai/pdf/shiryo6.pdf>

[NPL 3] Ryuichi Takechi and two other authors, "Technology to Optimize Radio Access Networks: Self-Organizing Network (SON)", Fujitsu Limited, July 2011, Fujitsu, Volume 62, Issue 4, pp. 449-454

SUMMARY OF THE INVENTION

Technical Problem

FIG. 13 is a flowchart showing processing performed when a base station fails in a conventional wireless communication system. The wireless communication system acquires information regarding the accommodation area of the failed base station from a DB (database). The wireless communication system selects a base station that can cover the area from among the base stations located near the failed base station, and instructs the selected base station to expand the coverage area thereof.

FIG. 14 is a diagram showing recovery of the coverage area of the failed base station performed through the processing in FIG. 13. FIG. 14(a) shows recovery performed in an environment where a plurality of base stations employ a single wireless scheme. By expanding the coverage area of the neighboring base station (adjacent base station) selected through the processing in FIG. 13, it is possible to accommodate the wireless terminals accommodated in the coverage area of the failed base station, in the coverage area of the neighboring base station.

FIG. 14(b) shows recovery performed in an environment where a plurality of base stations employ different wireless schemes. Each base station may switch between a plurality of wireless schemes in cycles or based on a schedule. In an environment where a plurality of wireless schemes coexist, the wireless scheme implemented by the failed base station may be different from that implemented by a neighboring base station. In such a case, even if a neighboring base station expands the coverage area thereof, the wireless terminals accommodated in the coverage area of the failed base station cannot be accommodated in the coverage area of the neighboring base station.

With the foregoing in view, it is an object of the present invention to provide a base station management method, a base station management apparatus, and a program that are capable of accommodating wireless terminals that are present in the coverage area of a failed base station, in that of another base station, in an environment where a plurality of wireless schemes coexist.

Means for Solving the Problem

One aspect of the present invention is a base station management method including: a selection step of creating a list of base stations that can cover an entirety or part of a coverage area of a failed base station, which is a base station that has failed, with reference to base station information indicating wireless schemes that can be implemented by the base stations, scheduled periods for implementation of the wireless schemes by the base stations, and coverage areas of the base stations in which wireless terminals can be accommodated, and selecting a base station that can implement an implementation-scheduled wireless scheme, which is a wireless scheme that is scheduled to be implemented by the failed base station, during a scheduled implementation period, which is the scheduled period for implementation of the implementation-scheduled wireless scheme of the failed base station, from among the base stations included in the list; and a setting step of setting the base station selected in the selection step so as to provide the implementation-scheduled wireless scheme to the coverage area of the failed base station during the scheduled implementation period.

One aspect of the present invention is a base station management apparatus including: a storage unit that stores base station information indicating wireless schemes that can be implemented by base stations, scheduled periods for implementation of the wireless schemes by the base stations, and coverage areas of the base stations in which wireless terminals can be accommodated; and a use base station selection unit (also referred to herein as base station selector) that creates a list of base stations that can cover an entirety or part of a coverage area of a failed base station, which is a base station that has failed, with reference to the base station information, selects a base station that can implement an implementation-scheduled wireless scheme, which is a wireless scheme that is scheduled to be implemented by the failed base station, during a scheduled implementation period, which is the scheduled period for implementation of the implementation-scheduled wireless scheme of the failed base station, from among the base stations included in the list, and sets the selected base station so as to provide the implementation-scheduled wireless scheme to the coverage area of the failed base station during the scheduled implementation period.

One aspect of the present invention is the above-described base station management apparatus, wherein the use base station selection unit selects a base station that is scheduled to implement the implementation-scheduled wireless scheme during the scheduled implementation period from among the base stations included in the list.

One aspect of the present invention is the above-described base station management apparatus, wherein, when the base stations in the list do not include a base station that is scheduled to implement the implementation-scheduled wireless scheme during the scheduled implementation period, the use base station selection unit selects a base station that can implement the implementation-scheduled wireless scheme and that is idle during the scheduled implementation period, from among the base stations included in the list.

One aspect of the present invention is the above-described base station management apparatus, wherein at least one of the base stations can implement a plurality of wireless schemes simultaneously through scheme multiplexing, and the use base station selection unit selects a base station that can implement the implementation-scheduled wireless scheme and in which there is at least one idle wireless system among the plurality of wireless schemes to be implemented through scheme multiplexing during the scheduled implementation period, from among the base stations included in the list.

One aspect of the present invention is the above-described base station management apparatus, wherein the use base station selection unit selects a base station that can implement the implementation-scheduled wireless scheme during a scheduled period for which a wireless terminal accommodated in the coverage area of the failed base station is to perform wireless communication, from among the base stations included in the list.

One aspect of the present invention is a program for enabling a computer to function as any one of the above-described base station management apparatuses.

Effects of the Invention

The present invention makes it possible to accommodate wireless terminals that are present in the coverage area of a failed base station in that of another base station, in an environment where a plurality of wireless schemes coexist.

BRIEF DESCRIPTION OF DRAWINGS

FIG. 4 is a diagram showing a base station information list according to the embodiment.

FIG. 5 is a diagram in which pieces of schedule information according to the embodiment are arranged on the same time axis.

FIG. 7 is a diagram showing an example of information used in processing performed by the base station management apparatus according to the embodiment.

DESCRIPTION OF EMBODIMENTS

Hereinafter, an embodiment of the present invention will be described in detail with reference to the drawings.

Figure 1:
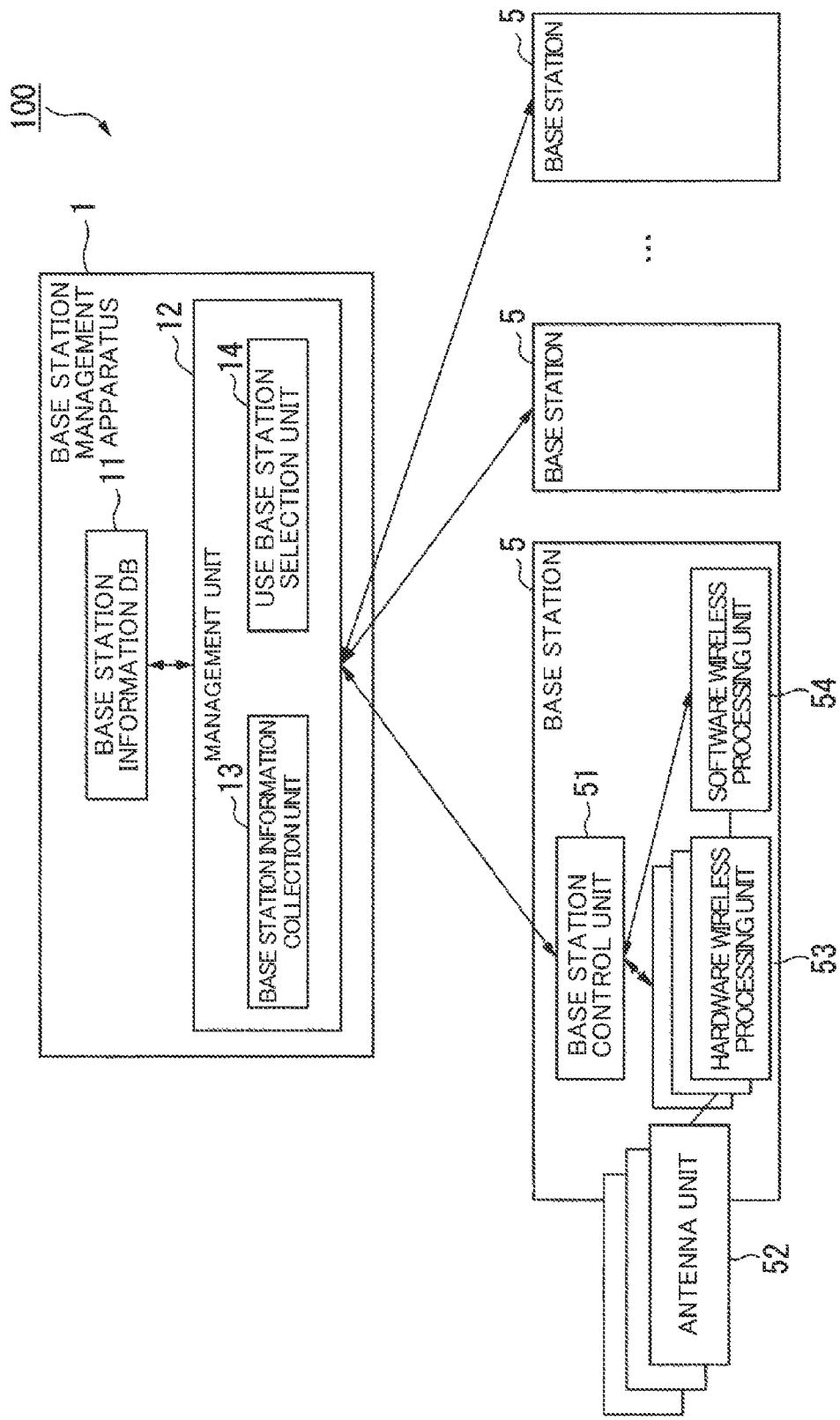
FIG. 1 is a diagram showing a configuration of a wireless communication system according to one embodiment of the present invention.

FIG. 1 is a diagram showing a configuration of a wireless communication system 100 according to one embodiment of the present invention. The wireless communication system 100 shown in the figure includes a base station management apparatus 1 and N base stations 5 (N is an integer no less than 2) that are connected to the base station management apparatus 1.

The base station management apparatus 1 includes a base station information DB (database) 11 and a management unit 12.

The base station information DB 11 is a storage unit that stores base station information about each base station 5. Base station information includes positional information regarding the base station 5, wireless schemes supported by the base station 5, wireless schemes that can be simultaneously multiplexed by the base station 5, schedule information regarding the base station 5, and accommodation service information regarding the base station 5. The wireless schemes supported by the base station 5 are wireless schemes that the base station 5 can implement upon wireless parameters being set. Schedule information indicates a wireless scheme that the base station 5 implements (activates) and a scheduled period during which the wireless scheme is to be implemented (activated). The scheduled period for implementation is expressed by a start time and an end time. Accommodation service information regarding the base station 5 includes information regarding the number of wireless terminals accommodated by the base station 5, the volume of traffic to be accommodated, and so on.

The management unit 12 includes a base station information collection unit 13 and a use base station selection unit 14 (also referred to herein as base station selector). The base station information collection unit 13 collects base station information and updates the base station information DB 11. The use base station selection unit 14 creates a list of base stations 5 that can cover the coverage area of a base station 5 that has failed (hereinafter also referred to as a failed base station), upon wireless parameters being set, with reference to base station information. The use base station selection unit 14 selects a base station 5 that can implement the wireless scheme that is scheduled to be implemented by the failed base station, during the scheduled period for the implementation, from among the base stations 5 included in the list. The use base station selection unit 14 sets wireless parameters regarding the wireless scheme scheduled to be implemented by the failed base station, the period during which the wireless scheme is to be implemented, transmission output, and so on, to the selected base station 5 so as to cover the coverage area of the failed base station.

The base stations 5 are access points (APs) that support software defined radio (SDR). Each base station 5 switches between a plurality of wireless schemes to be implemented, in cycles or based on a schedule. Each base station 5 performs wireless communication with wireless terminals (not illustrated) in the coverage area thereof through wireless processing performed by software. Each base station 5 includes a base station control unit 51, antenna units 52, hardware wireless processing units 53, and a software wireless processing unit 54. Each base station 5 includes an antenna unit 52 and a hardware wireless processing unit 53 for each wireless scheme to be implemented.

The base station control unit 51 notifies the base station management apparatus 1 of base station information regarding the base station 5 or part of the information. The base station control unit 51 operates hardware wireless processing unit 53 for the wireless scheme to be implemented by the base station 5 based on a schedule, and, furthermore, sets wireless parameters for implementing the wireless scheme to the software wireless processing unit 54. Furthermore, the base station control unit 51 notifies the base station management apparatus 1 when a hardware wireless processing unit 53 or a software wireless processing unit 54 fails.

Each antenna unit 52 transmits and receives wireless signals of the wireless scheme corresponding thereto. Each hardware wireless processing unit 53 performs wireless processing, using hardware for the wireless scheme corresponding thereto. For example, each hardware wireless processing unit 53 down-converts wireless signals received by an antenna unit 52. Also, for example, each hardware wireless processing unit 53 up-converts transmission signals and transmits the signals from an antenna unit 52.

The software wireless processing unit 54 performs wireless processing for the wireless schemes, using wireless parameters set by the base station control unit 51. For example, the software wireless processing unit 54 receives baseband signals from a hardware wireless processing unit 53, and demodulates and decodes the baseband signals. Also, for example, the software wireless processing unit 54 generates baseband signals, and outputs the baseband signals to the hardware wireless processing unit 53 corresponding to the wireless scheme to be used for transmission.

Figure 2:
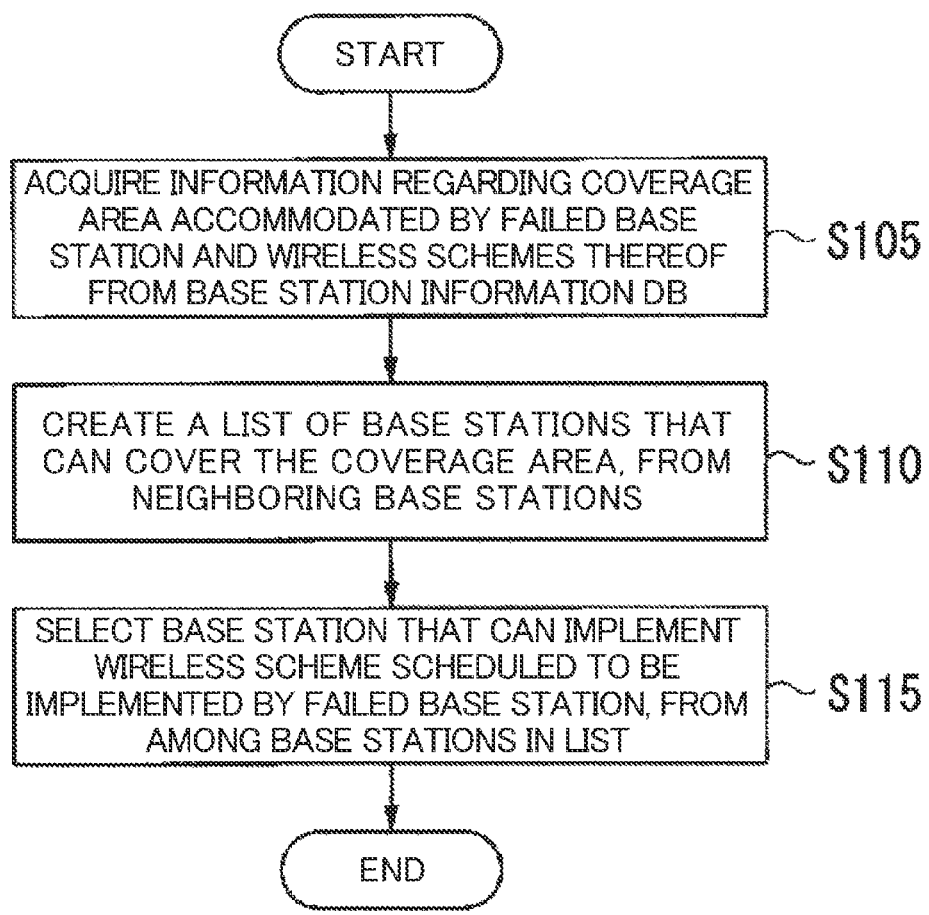
FIG. 2 is a flowchart showing an outline of processing performed by a base station management apparatus according to the embodiment.
Figure 3:
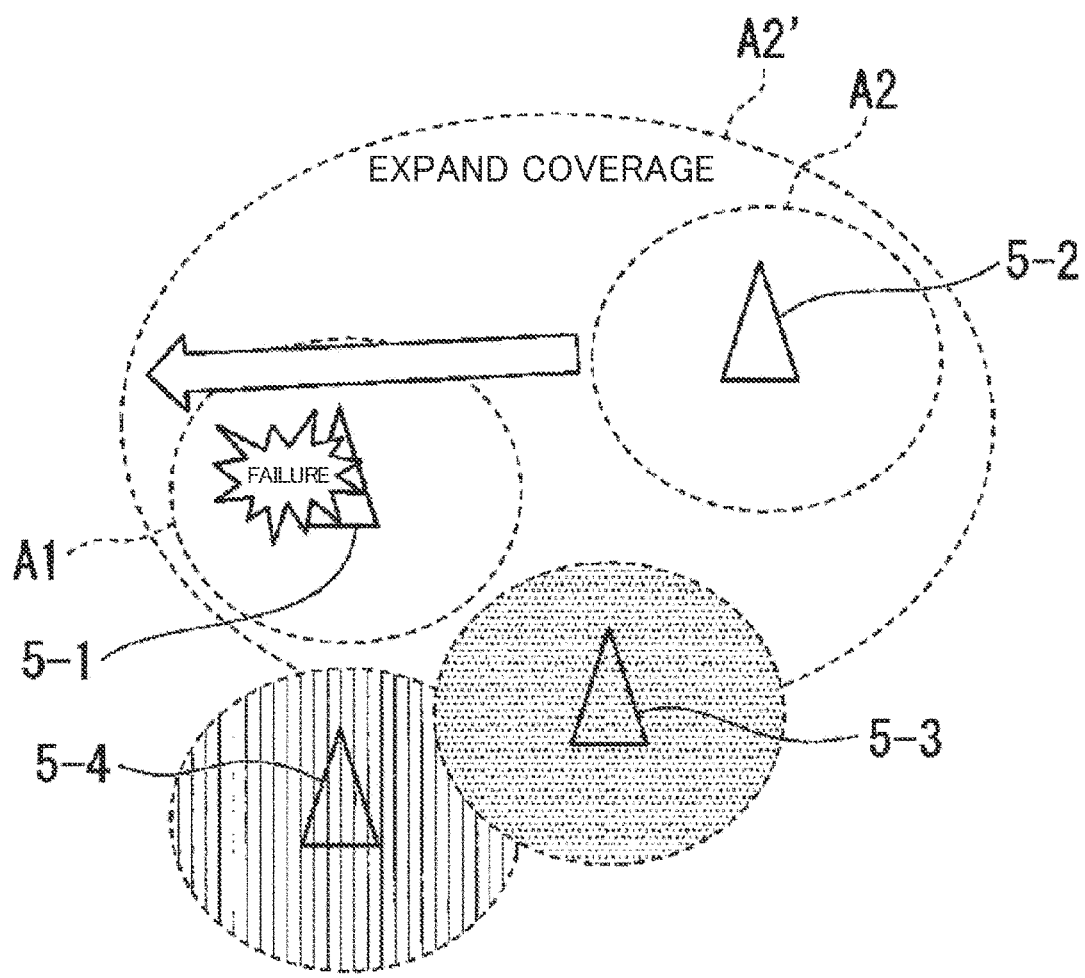
FIG. 3 is a diagram showing an example of recovery of a coverage area of a failed base station according to the embodiment.

FIG. 2 is a flowchart showing an outline of processing performed by the base station management apparatus 1, and FIG. 3 is a diagram showing an example of recovery of the coverage area of a failed base station. The n-th base station 5 (n is an integer no less than 1 and no greater than N) of the N base stations 5 included in the wireless communication system 100 is denoted as a base station 5-$n$.

The base station information collection unit 13 of the base station management apparatus 1 collects base station information regarding each base station 5, and registers the information in the base station information DB 11. When a base station 5-1 that is providing a service fails, the use base station selection unit 14 acquires information regarding the coverage area accommodated by the base station 5-1 and the wireless schemes thereof, based on the base station information stored in the base station information DB 11 (step S105). Based on base station information regarding other base stations 5 stored in the base station information DB 11, the use base station selection unit 14 creates a list of base stations 5 that can cover an area A1 accommodated by the base station 5-1, from the base stations 5 located near the base station 5-1 (step S110). The use base station selection unit 14 selects a base station 5-2 that can implement the wireless schemes scheduled to be implemented by the base station 5-1, from among the base stations 5-2 to 5-4 in the list (step S115). The use base station selection unit 14 sets, to the selected base station 5-2, implementation periods for the wireless schemes scheduled to be implemented by the base station 5-1, and wireless parameters for the wireless schemes. The wireless parameters include a setting value used to expand an area A2, scheduled to be provided by the base station 5-2, to an area A2' that includes the area A1.

FIG. 4 is a diagram showing a base station information list. The base station information list shown in the figure is an example of information obtained as a result of the list creation performed in step S110 in FIG. 2. The base station information list is a list of pieces of base station information regarding the base stations 5 located near the failed base station. Each piece of base station information included in the base station information list is given a list number. Each list number is a unique number in the base station information list.

The base station information list includes, for each base station 5, a base station number, a base station position, supported wireless schemes, the number of wireless schemes that can be multiplexed, the wireless scheme that is currently implemented, the number of terminals accommodated, the volume of traffic accommodated, positions of the accommodated terminals, and schedule information. The base station number is identification information that uniquely specifies the base station 5. The base station position indicates the position at which the base station 5 is provided, using coordinates. For example, the base station position may be expressed by a latitude and a longitude, or may be a coordinate position on an x-y coordinate plane with the origin at a given point. The height of the position at which the base station 5 is provided may also be used as the base station position. If the area covered by each base station 5 has a predetermined shape and size like a circle around the position of the base station 5, the position of the base station 5 may be used as information indicating the area that can be covered by the base station 5. In such a case, it is possible to determine whether or not the coverage area of the base station 5-$i$ can be covered by expanding the coverage area of the base station 5-$j$ by using the distance between the base station 5-$i$ ($i$ is an integer no less than 1 and no greater than N) and the base station 5-$j$ ($j \neq i$, $j$ is an integer no less than 1 and no greater than N).

The supported wireless schemes are wireless schemes that can be implemented by the base station 5. The number of wireless schemes that can be multiplexed is the number of wireless schemes that the base station 5 can use (implement) at the same time. Instead of the number of wireless schemes that can be multiplexed, the number of antenna units 52 provided in the base station 5 may be used. The wireless scheme that is currently implemented is the wireless scheme that is currently implemented (operated) by the base station 5 from among the supported wireless schemes. The number of terminals accommodated is the number of wireless terminals that are accommodated in the coverage area of the base station 5. The positions of the accommodated terminals are the positions of the wireless terminals that are accommodated in the coverage area of the base station 5. The volume of traffic accommodated is the volume of traffic accommodated by the base station 5.

FIG. 5 is a diagram showing an example in which pieces of schedule information obtained from the pieces of base station information regarding the base stations 5 stored in the base station information DB 11 are arranged on the same time axis. As shown in the figure, each piece of schedule information indicate a period in which a base station 5 implements a wireless scheme.

Next, the details of processing performed by the base station management apparatus 1 will be described.

The base station information collection unit 13 of the base station management apparatus 1 collects base station information in the following manner. First, when a base station 5 is installed, the base station information collection unit 13 registers the pieces of static information from among the pieces of base station information regarding the base station 5, in the base station information DB 11. The pieces of static information are the base station number, the base station position, the supported wireless schemes, and the number of wireless schemes that can be multiplexed.

During the operation of the base station 5, the base station information collection unit 13 of the base station management apparatus 1 registers the pieces of dynamic information from among the pieces of base station information regarding the base station 5, in the base station information DB 11. Specifically, the use base station selection unit 14 assigns schedule information, the number of terminals accommodated, the volume of traffic accommodated, the wireless schemes to be implemented, and implementation timings, to the base station 5. Based on these pieces of information, the base station information collection unit 13 updates the wireless scheme that is currently implemented, the number of terminals accommodated, the volume of traffic accommodated, and the schedule information regarding the base station information stored in the base station information DB 11. The base station information collection unit 13 acquires information regarding the positions of the accommodated wireless terminals from each base station 5, and sets the information to the base station information.

Figure 6:
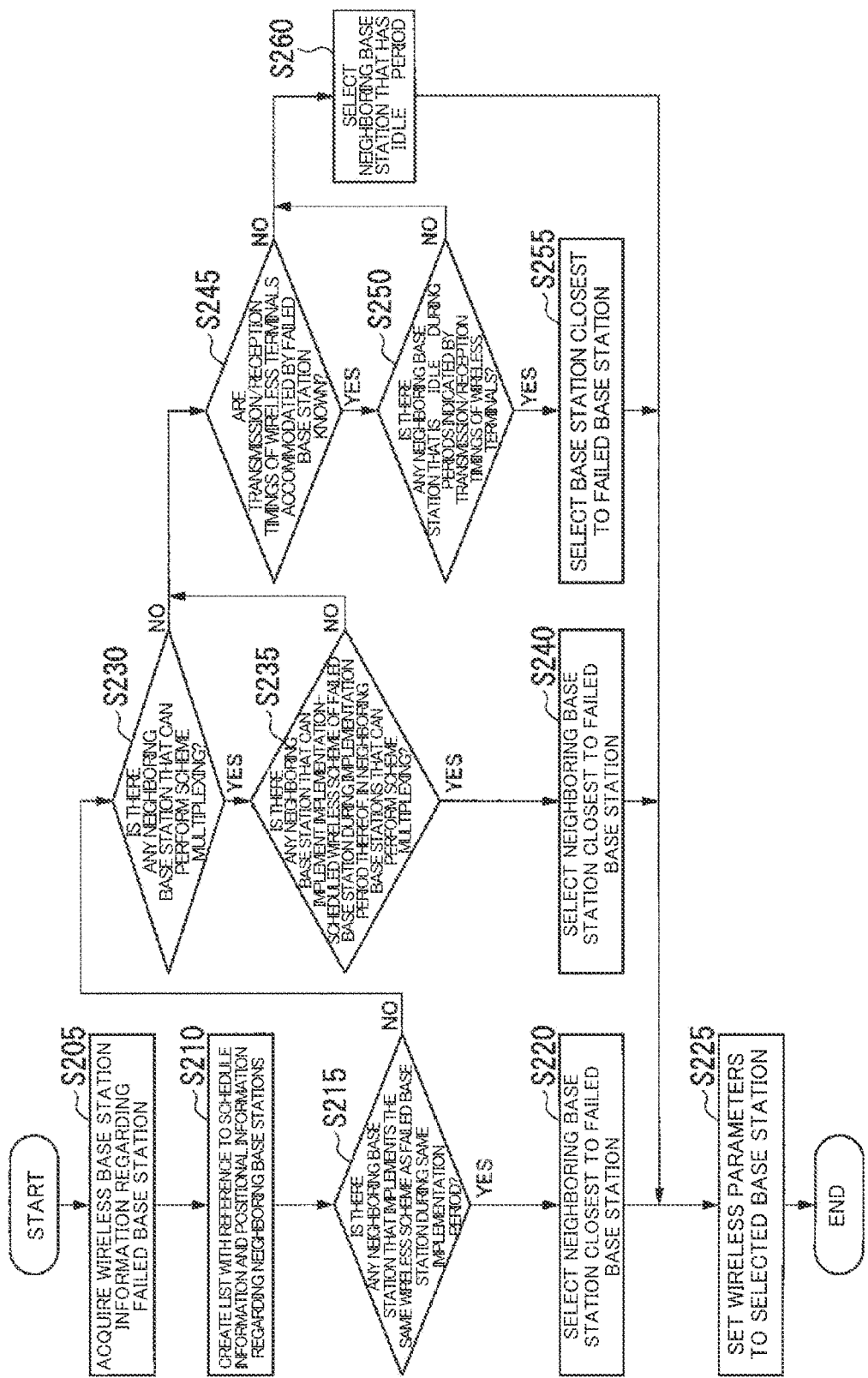
FIG. 6 is a flowchart showing processing performed by the base station management apparatus according to the embodiment.

FIG. 6 is a flowchart showing processing performed by the base station management apparatus 1.

The use base station selection unit 14 acquires scheduling information (the wireless schemes scheduled to be implemented, and the periods therefor), the number of terminals accommodated, the positions of the accommodated terminals, and the volume of traffic accommodated from the base station information regarding the failed base station stored in the base station information DB 11 (step S205).

The use base station selection unit 14 forms a list of scheduling information regarding the base stations 5 located near the failed base station (hereinafter referred to as neighboring base stations) and positional information regarding the neighboring base stations, by acquiring them from the base station information DB 11, and thus generates a base station information list (step S210). For example, when the expanded coverage area of a base station 5 (the coverage area of the base station 5 if the base station 5 is a large zone base station) includes a predetermined percentage or more of the coverage area of the failed base station at the time of the occurrence of the failure, the use base station selection unit 14 may determine the base station 5 as a neighboring base station. The predetermined percentage may be freely set, and may be 50%, 80%, or the like, or 100% which means that the entire coverage area is included. Alternatively, the use base station selection unit 14 may determine a base station 5 as a neighboring base station when the distance between the base station position of the base station 5 and the base station position of the failed base station is no greater than a predetermined value, or may determine a base station 5 as a neighboring base station when the distances between the base station position of the base station 5 and the positions of the accommodated terminals of the failed base station are no greater than a predetermined value. Note that the predetermined values are based on the size of the area that can be covered by expanding the coverage area of each base station 5.

The use base station selection unit 14 determines whether or not there is a neighboring base station that implements the same wireless scheme as the wireless scheme scheduled to be implemented by the failed base station during the same implementation period, with reference to the base station information list generated in step S210 (step S215). Note that the implementation periods of a plurality of neighboring base stations may be added. In addition, the use base station selection unit 14 may determine whether or not there is a neighboring base station that implements the same wireless scheme as the wireless scheme scheduled to be implemented by the failed base station during the same implementation period, and that can accommodate the number of terminals and the volume of traffic accommodated by the failed base station.

Upon determining that there are such neighboring base stations in step S215 (step S215: YES), the use base station selection unit 14 selects the neighboring base station closest to the failed base station from among the neighboring base stations, as a selected base station (step S220). The use base station selection unit 14 sets, to the selected base station, wireless parameters regarding, for example, operation periods, wireless schemes, transmission output, and so on, so that the selected base station covers the coverage area of the failed base station using the wireless scheme scheduled to be implemented, during the implementation period thereof (step S225).

On the other hand, upon determining that there is no such neighboring base station in step S215 (step S215: NO), the use base station selection unit 14 determines whether or not there is a base station that can perform scheme multiplexing, in the neighboring base stations that can implement the wireless scheme scheduled to be implemented by the failed base station, with reference to the base station information list generated in step S210 (step S230).

Upon determining that there is such a base station in step S230 (step S230: YES), the use base station selection unit 14 determines whether or not there is a neighboring base station that can implement the wireless scheme scheduled to be implemented by the failed base station, during the implementation period thereof, in the neighboring base stations that can perform scheme multiplexing, with reference to the base station information list generated in step 3210 (step S235). When at least one wireless scheme implementation status is idle, the wireless scheme being included in the wireless schemes which a neighboring base station can implement through scheme multiplexing, during the period in which the wireless scheme is scheduled to be implemented by the failed base station, and the neighboring base station can implement the wireless scheme scheduled to be implemented by the failed base station, the use base station selection unit 14 determines that the neighboring base station can implement the wireless scheme. Note that the use base station selection unit 14 may determine that the neighboring base station can implement the wireless scheme when the neighboring base station can also accommodate the number of terminals and the volume of traffic accommodated by the failed base station.

Upon determining that there are such neighboring base stations in step S235 (step S235), the use base station selection unit 14 selects the neighboring base station closest to the failed base station from among the neighboring base stations, as a selected base station (step S240). The use base station selection unit 14 sets, to the selected base station, wireless parameters regarding, for example, the period during which the selected base station is to operate, the wireless schemes, the transmission output, and so on, so that the selected base station covers the coverage area of the failed base station using the wireless scheme scheduled to be implemented, during the implementation period thereof (step S225).

Upon determining that there is no such neighboring base station in step S230 (step S230: NO), the use base station selection unit 14 determines whether or not the transmission/reception timings of the wireless terminals accommodated by the failed base station are known (step S245). For example, if a schedule indicating the transmission/reception timings of the wireless terminals can be acquired or has been acquired from the failed base station, the use base station selection unit 14 determines that the transmission/reception timings are known. Alternatively, a schedule indicating the transmission/reception timings of the wireless terminals may be acquired from any apparatus such as an apparatus (not illustrated) that assigns transmission/reception timings to the wireless terminals in the wireless communication system 100.

Upon determining that the transmission/reception timings are known in step S245 (step S245: YES), the use base station selection unit 14 determines whether or not there is a neighboring base station that is idle during the periods indicated by the transmission/reception timings of the wireless terminals, in the neighboring base stations that can implement the wireless scheme scheduled to be implemented by the failed base station, with reference to the base station information list generated in step S210 (step S250).

Upon determining that there are such neighboring base stations in step S250 (step S250: YES), the use base station selection unit 14 selects the neighboring base station closest to the failed base station from among the neighboring base stations that are idle during the periods indicated by the transmission/reception timings of the wireless terminals, as a selected base station (step S255). The use base station selection unit 14 sets, to the selected base station, wireless parameters regarding, for example, operation periods, wireless schemes, transmission output, and so on, so that the selected base station covers the coverage area of the failed base station using the wireless scheme scheduled to be implemented, during the implementation period thereof (step S225).

Upon determining that the transmission/reception timings are not known in step S245 (step S245: NO), or upon determining that there is no idle neighboring base station in step S250 (step S250: NO), the use base station selection unit 14 performs the processing in step S260. That is to say, the use base station selection unit 14 selects a base station 5 that is idle during the period in which the wireless scheme is scheduled to be implemented by the failed base station, from among the neighboring base stations that can implement the wireless scheme scheduled to be implemented by the failed base station, as a selected base station, with reference to the base station information list generated in step S210 (step S260). The use base station selection unit 14 sets, to the selected base station, wireless parameters regarding, for example, operation periods, wireless schemes, transmission output, and so on, so that the selected base station covers the coverage area of the failed base station using the wireless scheme scheduled to be implemented, during the implementation period thereof (step S225).

FIG. 7 is a diagram showing examples of pieces of information regarding the base station 5 to be subjected to the processing in steps S220, S240, and S255 in FIG. 6. FIG. 7(a) shows information that can be acquired from base station information regarding the failed base station, and indicates the base station number (the failed base station number), the wireless scheme, and the base station position of the failed base station. FIG. 7(b) is information that can be acquired from the base station information list, and indicates the list number, the base station number, the wireless scheme, and the base station position of each neighboring base station.

Figure 8:
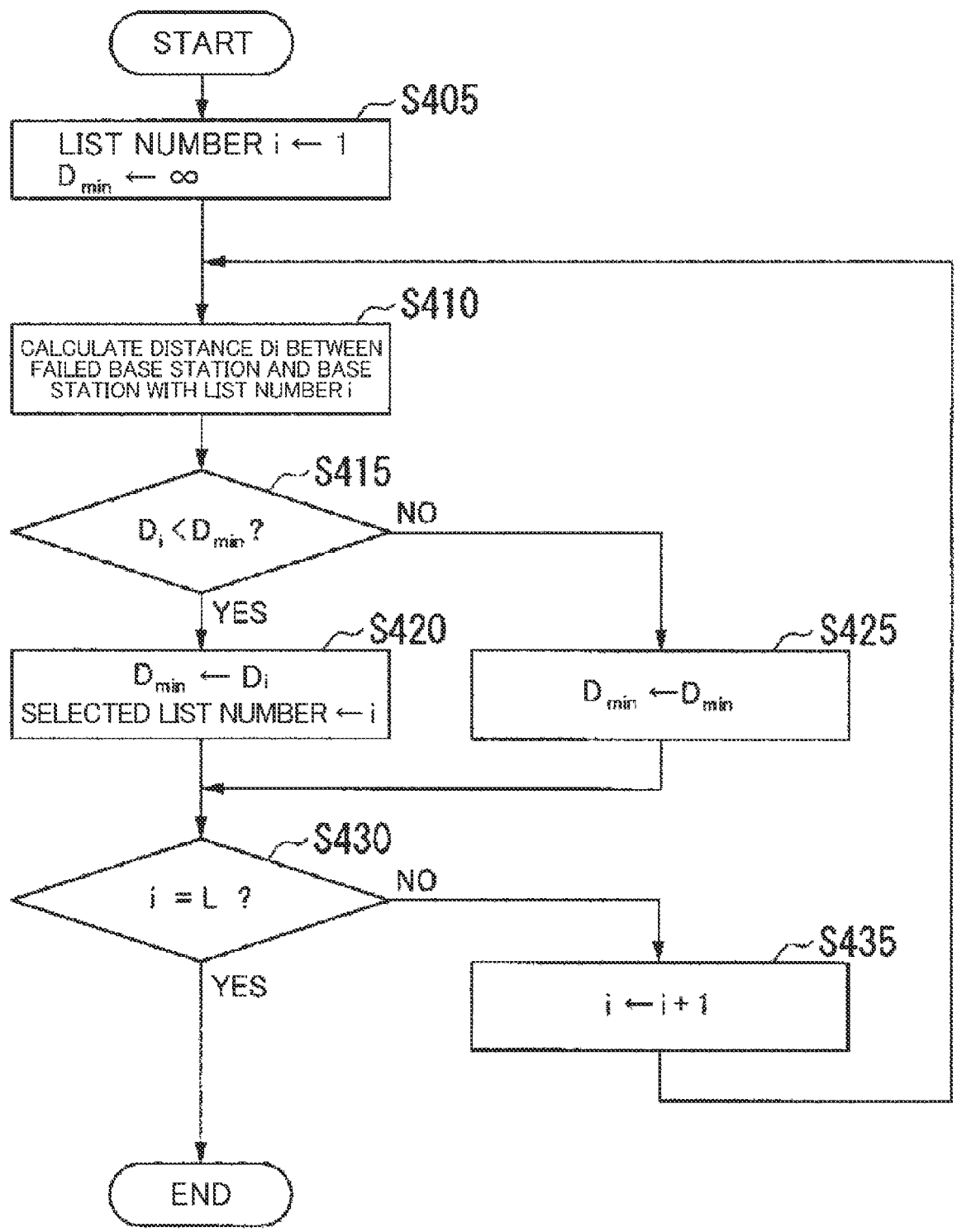
FIG. 8 is a flowchart showing an example of selection processing performed by the base station management apparatus according to the embodiment.

FIG. 8 is a flowchart showing an example of selection processing in steps S220, S240, and S255 in FIG. 7. The use base station selection unit 14 initializes a variable i, which indicates the list number, to be 1, and initializes a minimum value $D_{min}$ of the distance to the failed base station, to be infinity (step S405). The use base station selection unit 14 calculates a distance $D_i$ between the base station position $(X_j, Y_j)$ of the failed base station (j is the base station number of the failed base station) and the base station position $(x_i, y_i)$ of the base station 5 with the list number i, using the following formula (1) (step S410).

[Formula 1]

$$D_i = \sqrt{(x_i - X_j)^2 + (y_i - Y_j)^2} \qquad (1)$$

If the distance $D_i$ is less than the minimum value $D_{min}$ (step S415: YES), the use base station selection unit 14 rewrites $D_{min}$ with $D_i$, and updates a selection list number to the list number i (step S420). On the other hand, if the distance $D_i$ is no less than the minimum value $D_i$ (step S415: NO), the use base station selection unit 14 does not change the value $D_{min}$ (step S425).

After performing the processing in step S420 or step S425, the use base station selection unit 14 determines whether or not the list number i has reached the number L of base stations set to the base station information list (step S430). Upon determining that the list number i has not reached the number L of base stations (step S430: NO), the use base station selection unit 14 adds 1 to the value of the list number i (step S435), and repeats the processing from step S410. Upon determining that the list number i has reached the number L of base stations (step S430: YES), the use base station selection unit 14 terminates selection processing.

The use base station selection unit 14 determines the base station 5 indicated by the base station information specified by the selection list number at the time of completion of processing, as the base station 5 closest to the failed base station.

FIGS. 9 to 12 are diagrams showing examples of selection of a base station 5 that covers the coverage area of the failed base station.

Figure 9:
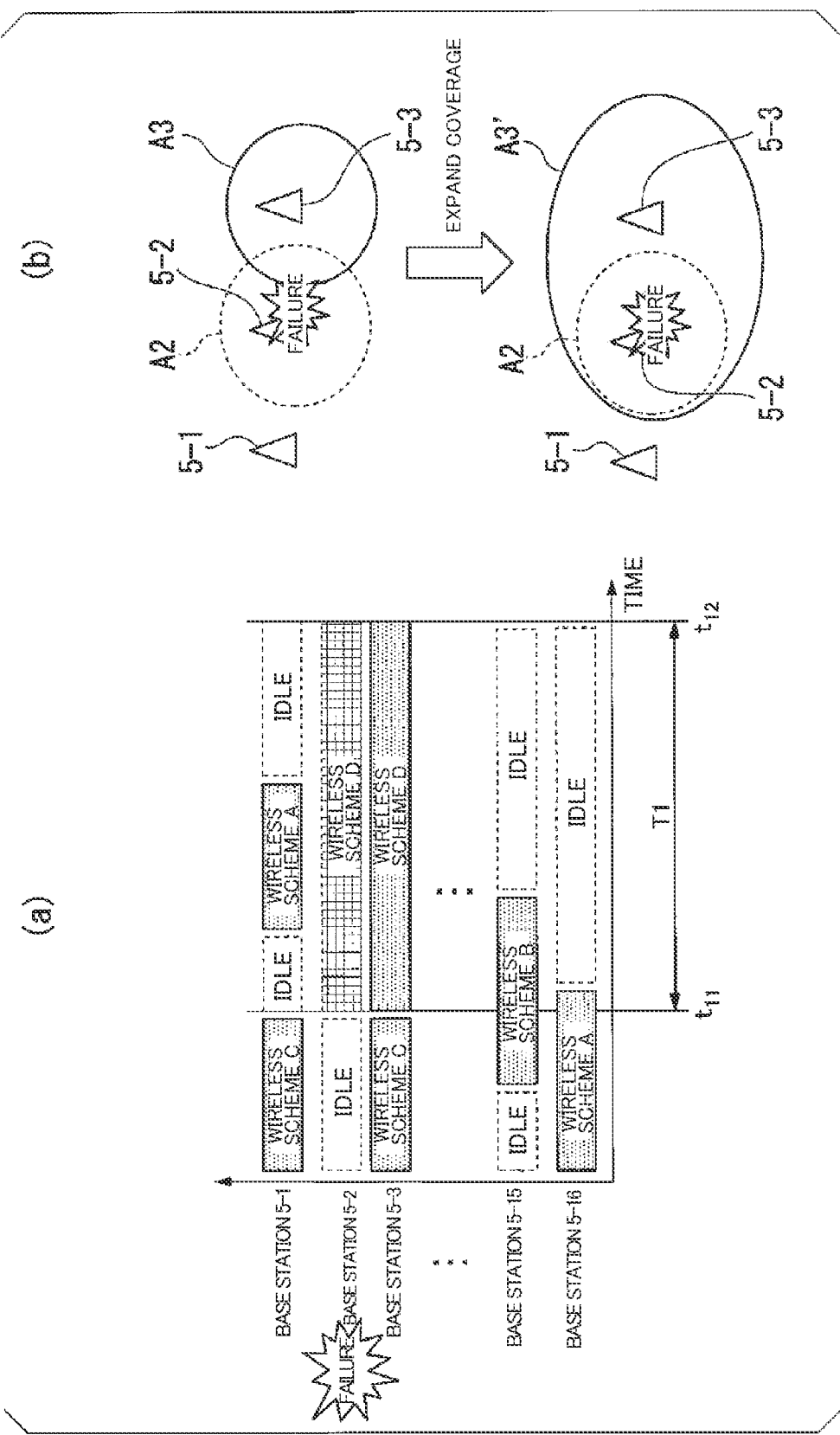
FIG. 9 is a diagram showing an example of selection of a base station that covers the coverage area of a failed base station according to the embodiment.

FIG. 9 is an example in which a base station that uses the same wireless scheme as the failed base station is selected from among the neighboring base stations, and the coverage area thereof is expanded. FIG. 9(*a*) is a diagram showing schedule information regarding the failed base station and the neighboring base stations. The use base station selection unit 14 acquires schedule information regarding the failed base station in the processing in step S205 in FIG. 6, and acquires the schedule information regarding the neighboring base stations in the processing in step S210 in FIG. 6. In this example, the failed base station is the base station 5-2, and the neighboring base stations are the base stations 5-1 and 5-3 to 5-16.

As shown in FIG. 9(*a*), a wireless scheme D is scheduled to be implemented by the failed base station during a period T1 from a time $t_{11}$ to a time $t_{12}$ after the occurrence of the failure. Therefore, the use base station selection unit 14 selects the base station 5-3 closest to the failed base station from among the neighboring base stations scheduled to implement the wireless scheme D during the period T1 (step S215: YES, and step S220 in FIG. 6). As shown in FIG. 9(*b*), the use base station selection unit 14 sets the base station 5-3 so as to expand the coverage area thereof from an area A3 to an area A3' and cover a coverage area A2 of the base station 5-2 during the period T1 (step S225 in FIG. 6).

Figure 10:
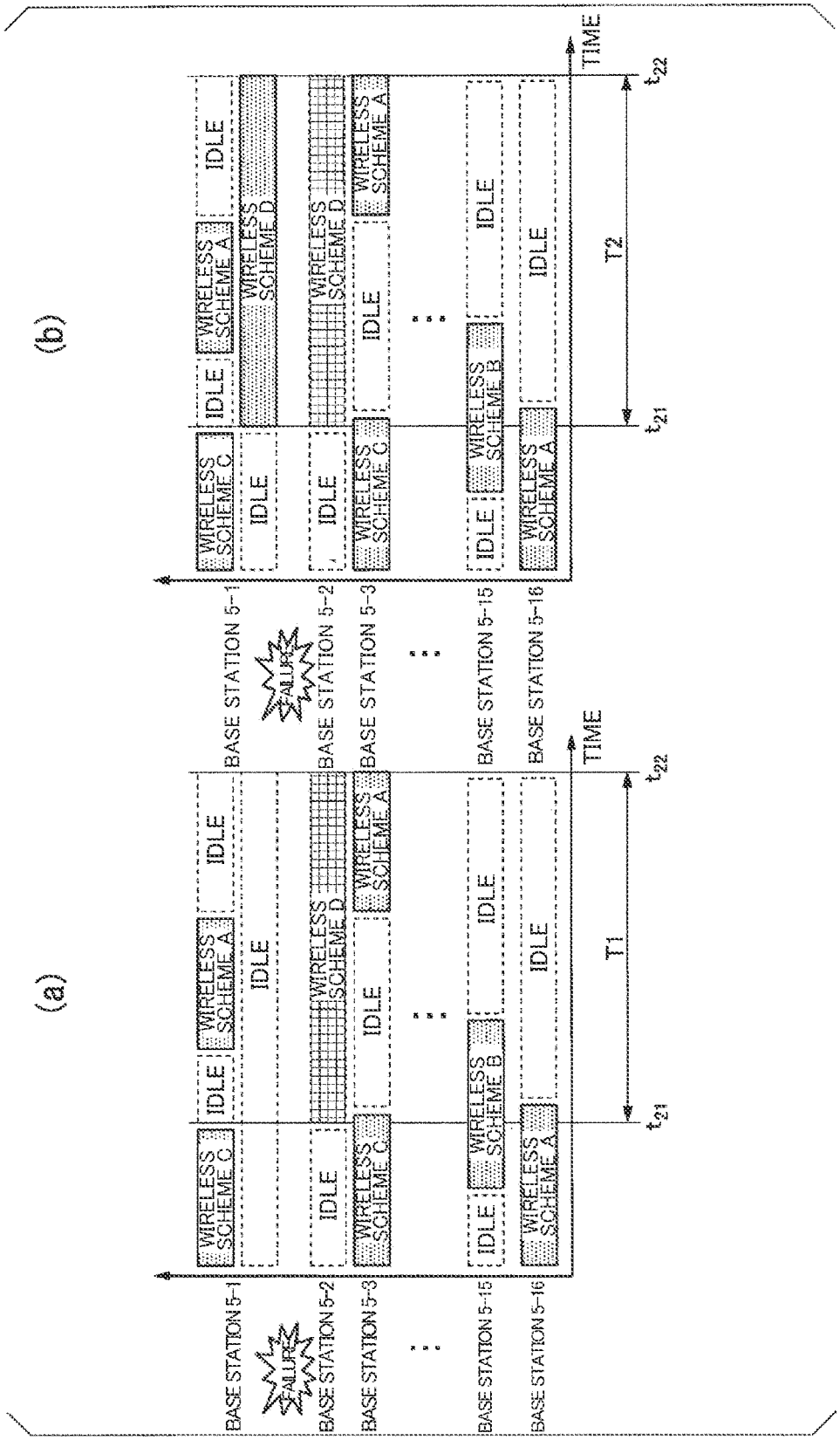
FIG. 10 is a diagram showing an example of selection of a base station that covers the coverage area of a failed base station according to the embodiment.

FIG. 10 shows an example in which a base station 5 that can perform wireless scheme multiplexing implements the wireless scheme that is scheduled to be implemented by the failed base station, through scheme multiplexing. FIG. 10(*a*) is a diagram showing schedule information regarding the failed base station and the neighboring base stations. In this example, the failed base station is the base station 5-2, and the neighboring base stations are the base stations 5-1 and 5-3 to 5-16. Also, the base station 5-1 can perform wireless scheme multiplexing.

As shown in FIG. 10(*a*), a wireless scheme D is scheduled to be implemented by the failed base station during a period T2 from a time $t_{21}$ to a time $t_{22}$ after the occurrence of the failure. No neighboring base station is scheduled to implement the wireless scheme D during the period T2 (step 3215 in FIG. 6: NO), and therefore the use base station selection unit 14 extracts a neighboring base station that can implement the wireless scheme D and perform wireless scheme multiplexing, and in which there is at least one idle wireless scheme among the wireless schemes to be implemented through wireless scheme multiplexing during the period T2 (step S230 in FIG. 6: YES, step S235: YES). The use base station selection unit 14 selects the base station 5-1 closest to the failed base station from among the extracted neighboring base stations (step S240 in FIG. 6). As shown in FIG. 10(*b*), the use base station selection unit 14 sets the base station 5-1 so as to implement the wireless scheme D to cover the coverage area of the failed base station during the period T2 (step S225 in FIG. 6).

Figure 11:
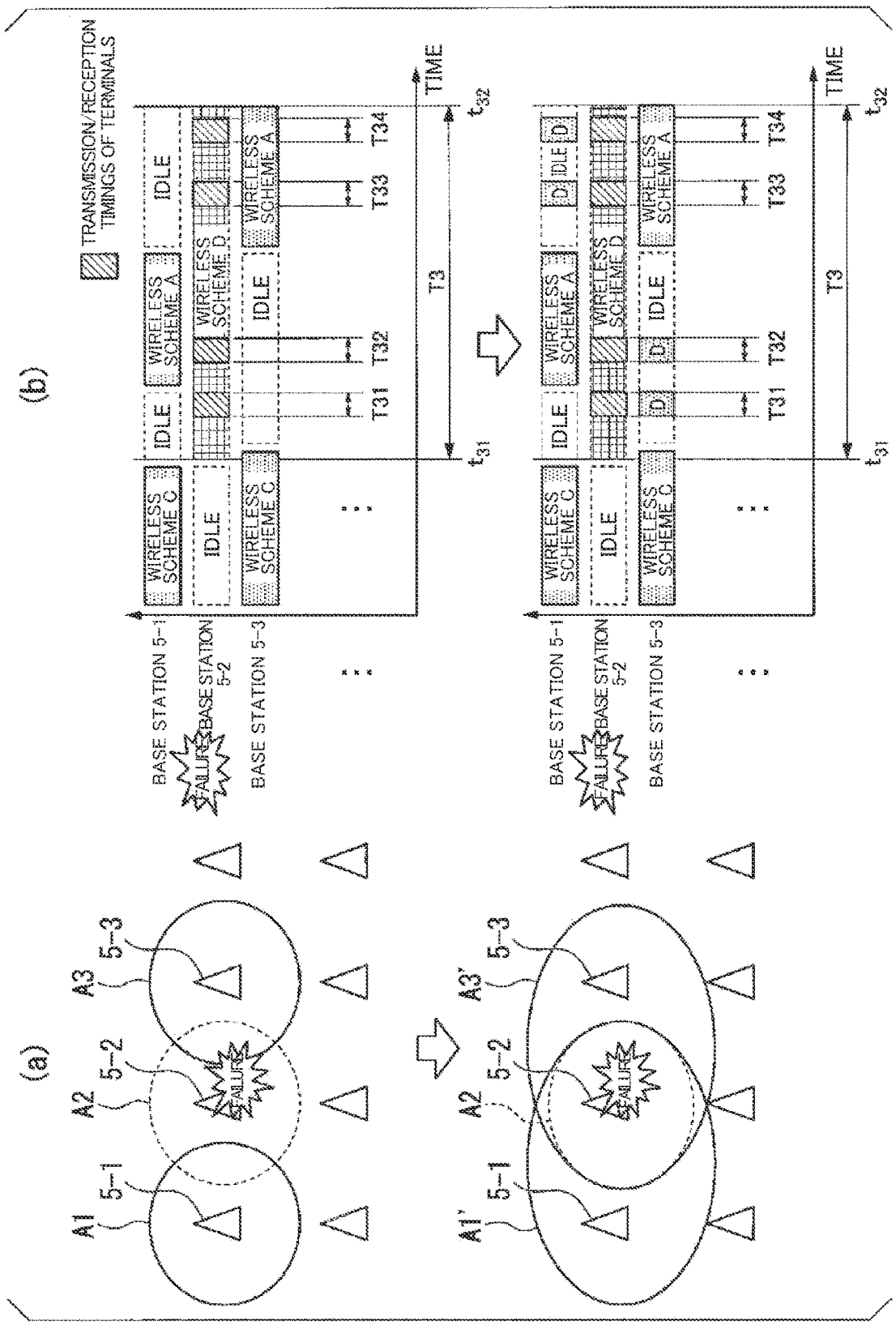
FIG. 11 is a diagram showing an example of selection of a base station that covers the coverage area of a failed base station according to the embodiment.

FIG. 11 shows an example in which the transmission/reception timings between the failed base station and wireless terminals are known. The upper figure in FIG. 11(*a*) is a diagram showing the failed base station and neighboring base stations. In the figure, the base station 5-2 is the failed base station, and the base stations 5-1 and 5-3 are neighboring base station. The upper figure in FIG. 11(*b*) is a diagram showing schedule information regarding the failed base station and the neighboring base stations at the occurrence of a failure.

The wireless scheme D is scheduled to be implemented by the failed base station during a period T3 from a time $t_{31}$ to a time $t_{32}$ after the occurrence of the failure. No neighboring base station is scheduled to implement the wireless scheme D during the period T3 (step S215 in FIG. 6: NO), and no neighboring base station can perform wireless scheme multiplexing (step S230 in FIG. 6: NO), and therefore the use base station selection unit 14 acquires a schedule for the wireless terminals accommodated in the coverage area of the failed base station at the occurrence of the failure (step S245 in FIG. 6: YES). The acquired schedule shows that wireless terminals perform wireless communication during periods T31, T32, T33, and T34 in the period T3.

During each of the periods T31, T32, T33, and T34, the use base station selection unit 14 selects the neighboring base station closest to the failed base station, from among the neighboring base stations that can implement the wireless scheme D and in which there is at least one idle wireless scheme. As shown in the lower figure in FIG. 11(*b*), the use base station selection unit 14 selects the base station 5-3 for the periods T31 and T32, and selects the base station 5-1 for the periods T33 and T34 (step S250 in FIG. 6). As shown in the lower figure in FIG. 11(*a*), the use base station selection unit 14 sets the base station 5-3 so as to expand the coverage area thereof from the area A3 to the area A3' to cover the coverage area A2 of the failed base station and implement the wireless scheme D during the periods T31 and T32, and sets the base station 5-1 so as to expand the coverage area thereof from the area A1 to the area A1' to cover the coverage area A2 of the failed base station and implement the wireless scheme D during the periods T33 and T34 (step S225 in FIG. 6).

Note that when the timings of transmission/reception between a base station and wireless terminals can be scheduled, the use base station selection unit 14 may perform scheduling so that the wireless terminals accommodated in the coverage area of the failed base station at the occurrence of the failure perform wireless communication during a period in which any of the neighboring base station that can implement the wireless scheme D during the period T3 is idle, and expand the coverage area as in FIG. 11. For example, the use base station selection unit 14 instructs the neighboring base station to notify the time at which a wireless terminal that has changed the schedule for wireless communication performs wireless communication, before the time is reached.

Figure 12:
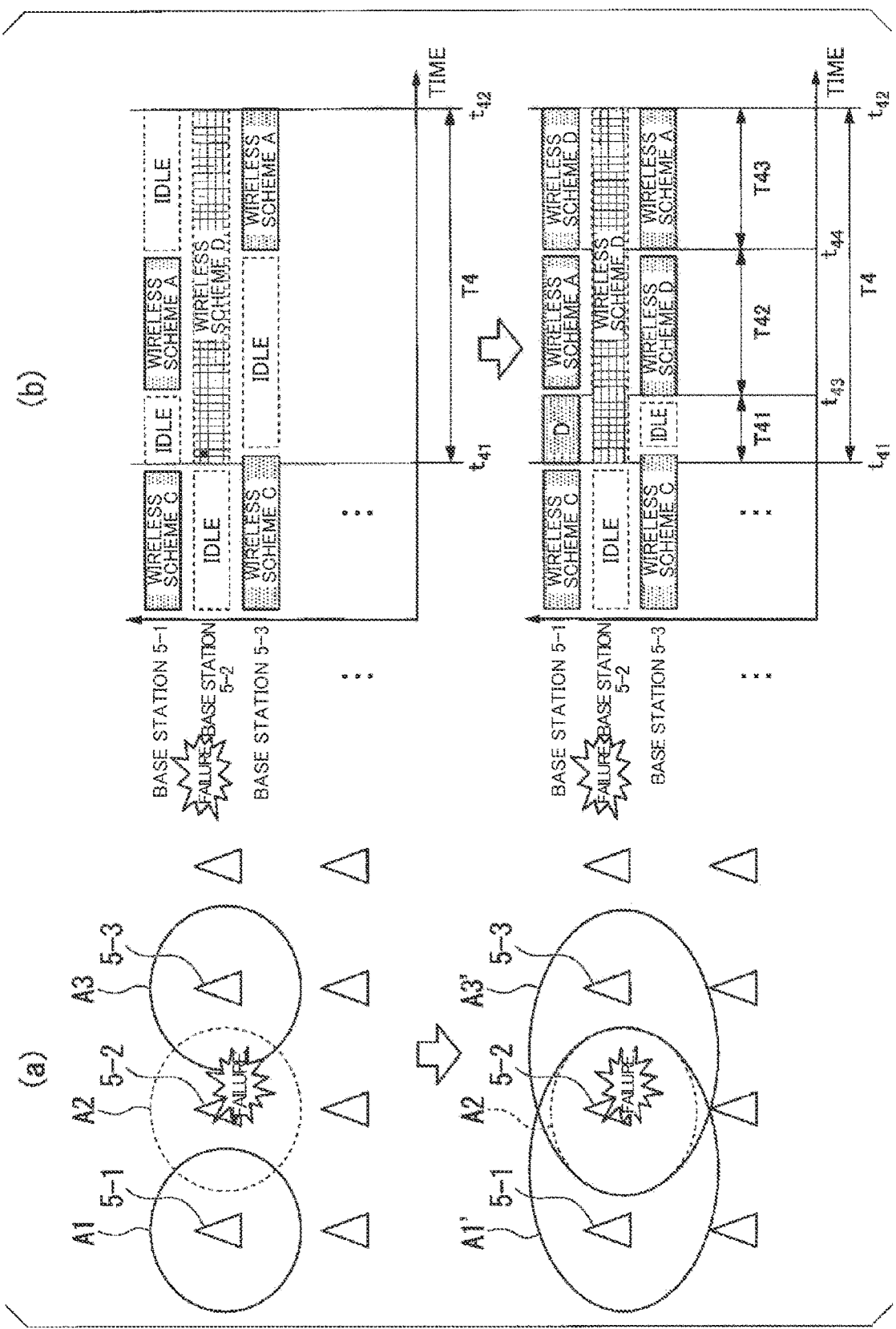
FIG. 12 is a diagram showing an example of selection of a base station that covers the coverage area of a failed base station according to the embodiment.
Figure 13:
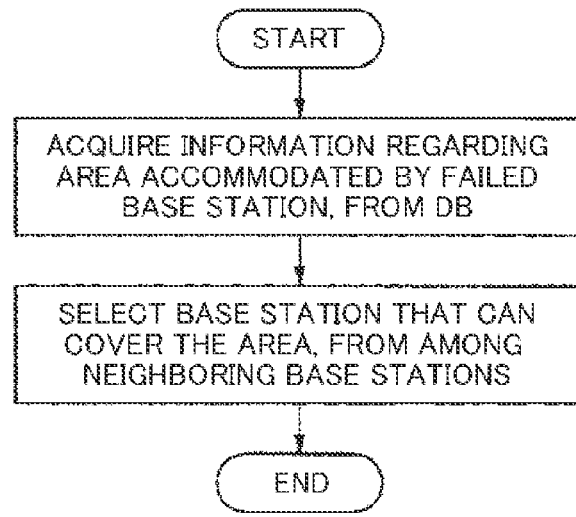
FIG. 13 is a flowchart showing processing performed when a base station fails in a conventional wireless communication system.
Figure 14:
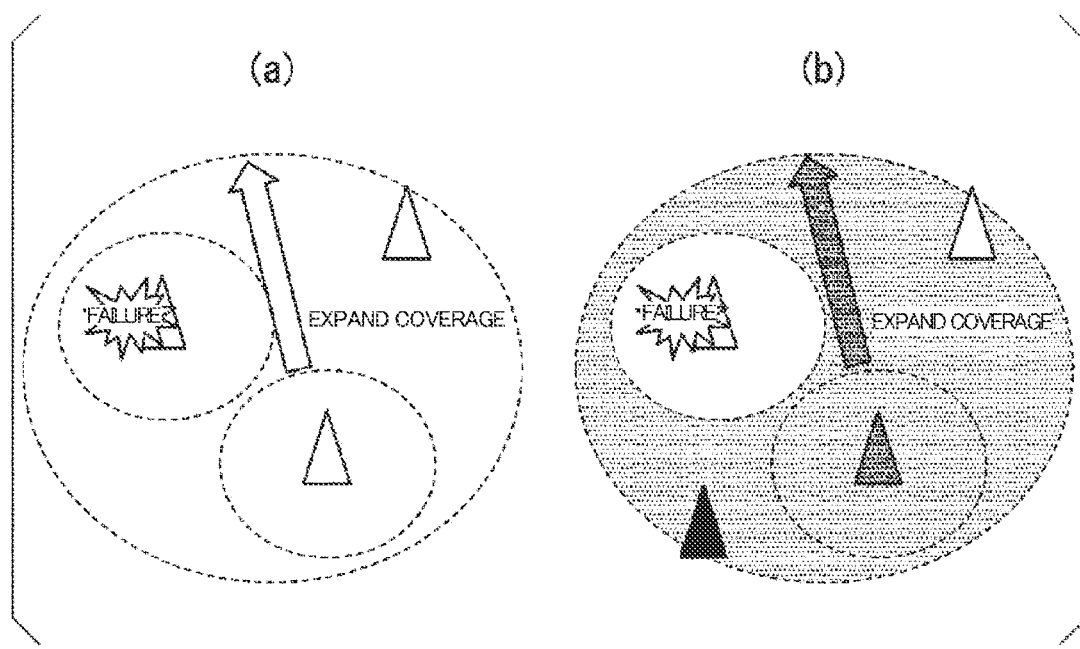
FIG. 14 is a diagram showing recovery of a coverage area of a failed base station in a conventional wireless communication system.

FIG. 12 shows an example in which the timings of transmission/reception between the base station and wireless terminals are unknown and scheduling cannot be performed. The upper figure in FIG. 12(*a*) is a diagram showing the failed base station and the neighboring base stations. In the figure, the base station 5-2 is the failed base station, and the base stations 5-1 and 5-3 are neighboring base station. The upper figure in FIG. 12(*b*) is a diagram showing schedule information regarding the failed base station and the neighboring base stations at the occurrence of a failure. The wireless scheme D is scheduled to be implemented by the failed base station during a period T4 from a time $t_{41}$ to a time $t_{42}$ after the occurrence of the failure. The use base station selection unit 14 determines that no neighboring base station is scheduled to implement the wireless scheme D during the period T4 (step S215 in FIG. 6: NO), no neighboring base station can perform wireless scheme multiplexing (step S230 in FIG. 6: NO), and it is not possible to acquire a schedule for the wireless terminals accommodated in the coverage area of the failed base station (step S245 in FIG. 6: NO). In this case, the use base station selection unit 14 selects a combination of one or more neighboring base stations that can implement the wireless scheme D so as to continuously be idle during the period T4 (step S260 in FIG. 6). As shown in the lower figure in FIG. 12(b), the use base station selection unit 14 selects the base station 5-1 for a period T41 from the time $t_{41}$ to a time $t_{43}$, and selects the base station 5-3 for a period T42 from the time $t_{43}$ to a time $t_{44}$, and selects the base station 5-1 for a period T43 from the time $t_{44}$ to the time $t_{42}$ in the period T4.

As shown in the lower figure in FIG. 12(a), the use base station selection unit 14 sets the base station 5-1 so as to expand the coverage area thereof from the area A1 to the area A1' to cover the coverage area A2 of the failed base station and implement the wireless scheme D during the periods T41 and T43, and sets the base station 5-3 so as to expand the coverage area thereof from the area A3 to the area A3' to cover the coverage area A2 of the failed base station and implement the wireless scheme D during the period T42 (step S225 in FIG. 6).

As described above, the base station management apparatus 1 performs scheduling regarding wireless schemes and implementation periods for the neighboring base station, considering the wireless scheme corresponding to the failed base station, and sets the wireless parameters again. Specifically, the base station management apparatus 1 performs scheduling in the following manner.

(1) A base station that is scheduled to implement the same wireless scheme as the wireless scheme scheduled to be implemented by the failed base station, in the same scheduled period expands the coverage area (FIG. 9).

(2) If the neighboring base stations of the failed base station include a base station that can perform scheme multiplexing, such a base station performs scheme multiplexing to cover the coverage area of the failed base station (FIG. 10).

(3) If periods for wireless communication between the wireless terminals accommodated by the failed base station and the base station are known or controllable, the neighboring base station implements the wireless scheme during the periods for wireless communication performed by the wireless terminals, and accommodate the wireless terminals (FIG. 11).

(4) An idle neighboring base station that can implement the wireless scheme scheduled to be implemented by the failed base station is selected (FIG. 12).

According to the above-described embodiment, even when base stations in a wireless communication system switches between a plurality of wireless schemes in cycles or according to a predetermined schedule, the wireless schemes to be implemented by the neighboring base stations and the implementation periods can be appropriately scheduled according to the wireless scheme scheduled to be implemented by the failed base station and the scheduled implementation time. Therefore, even in an environment where a plurality of wireless schemes coexist, the wireless terminals accommodated by a failed base station can be accommodated by another base station.

The functions of the base station management apparatus 1 according to the above-described embodiment may be realized by a computer. In such a case, a program for realizing the functions may be recorded on a computer-readable recording medium, and the functions may be realized by loading the program recorded on the recording medium to a computer system and executing the program.

Note that the "computer system" mentioned here includes an OS and hardware such as peripheral devices. The "computer-readable recording medium" refers to a portable medium such as a flexible disk, a magneto-optical disk, a ROM, or a CD-ROM, or a storage device built in the computer system, such as a hard disk. Furthermore, examples of the "computer-readable recording medium" include a medium that dynamically holds the program for a short period of time, like a communication line when transmitting the program through a network such as the Internet or a communication line such as a telephone line, and a medium that holds the program for a certain period of time like a volatile memory in a computer system that serves as a server or a client in that case. Also, the above-described program may be a program for realizing some of the aforementioned functions, or for realizing the aforementioned functions in combination with a program that has already been recorded in the computer system.

According to the above-described embodiment, a base station management apparatus includes a storage unit and a base station management apparatus. The storage unit stores base station information that indicates wireless schemes that can be implemented by base stations, scheduled periods for implementation of the wireless schemes, and coverage areas of the base stations in which wireless terminals can be accommodated. A use base station selection unit creates a list of base stations that can cover a coverage area of a failed base station, which is a base station that has failed, with reference to the base station information, and selects a base station that can implement an implementation-scheduled wireless scheme, which is a wireless scheme that is scheduled to be implemented by the failed base station, during a scheduled implementation period, which is the scheduled period for implementation of the implementation-scheduled wireless scheme of the failed base station, from among the base stations included in the list. The use base station selection unit sets the selected base station so as to provide the implementation-scheduled wireless scheme to the coverage area of the failed base station during the scheduled implementation period.

The use base station selection unit may select a base station that is scheduled to implement the implementation-scheduled wireless scheme during the scheduled implementation period from among the base stations included in the list, and if there is no such base station, the use base station selection unit may select a base station that can implement the implementation-scheduled wireless scheme and that is idle during the scheduled implementation period, from among the base stations included in the list.

Also, if at least one of the base stations can implement a plurality of wireless schemes simultaneously through scheme multiplexing, the use base station selection unit may select a base station that can implement the implementation-scheduled wireless scheme and in which there is availability for the implementation-scheduled wireless scheme among the plurality of wireless schemes to be implemented through scheme multiplexing during the scheduled implementation period, from among the base stations included in the list.

Also, the use base station selection unit may select a base station that can implement the implementation-scheduled wireless scheme during a scheduled period for which a wireless terminal accommodated in the coverage area of the failed base station is to perform wireless communication, from among the base stations included in the list.

Although the embodiment of the present invention has been described in detail with reference to the drawings, a specific configuration is not limited to the embodiment, and a design change or the like made without departing from the spirit of the invention is also included in the scope of the invention.

REFERENCE SIGNS LIST

1 Base station management apparatus
5 Base station
11 Base station information DB
12 Management unit
13 Base station information collection unit
14 Use base station selection unit
51 Base station control unit
52 Antenna unit
53 Hardware wireless processing unit
54 Software wireless processing unit
100 Wireless communication system

The invention claimed is:

1. A base station management method comprising:
creating a list of base stations that can cover an entirety or part of a coverage area of a failed base station based on at least in part of base station information which comprises: wireless modulation schemes that can be implemented by the base stations; scheduled time periods for implementation of the wireless modulation schemes by the base stations; and coverage areas of the base stations in which wireless terminals can be accommodated;
selecting a base station that can implement a wireless modulation scheme of the failed base station during a scheduled implementation time period of the failed base station from the list; and
setting the base station selected in the selecting so as to provide the implementation-scheduled wireless modulation scheme to the coverage area of the failed base station during the scheduled implementation time period.

2. A base station management apparatus comprising:
a storage that stores base station information which comprises wireless modulation schemes that can be implemented by base stations; scheduled time periods for implementation of the wireless modulation schemes by the base stations; and coverage areas of the base stations in which wireless terminals can be accommodated; and
one or more processors configured to execute instructions and thereby perform to:
create a list of base stations that can cover an entirety or part of a coverage area of a failed base station based on at least in part of the base station information;
select a base station that can implement a wireless modulation scheme of the failed base station during a scheduled implementation time period of the failed base station from the list; and
set the selected base station so as to provide the implementation-scheduled wireless modulation scheme to the coverage area of the failed base station during the scheduled implementation time period.

3. The base station management apparatus according to claim 2, wherein the one or more processors are configured to perform to select a base station that is scheduled to implement the implementation-scheduled wireless modulation scheme during the scheduled implementation time period from among the base stations included in the list.

4. The base station management apparatus according to claim 3, wherein, when the base stations in the list do not include a base station that is scheduled to implement the implementation-scheduled wireless modulation scheme during the scheduled implementation time period, the one or more processors are configured to select a base station that can implement the implementation-scheduled wireless modulation scheme and that is idle during the scheduled implementation time period, from among the base stations included in the list.

5. The base station management apparatus according to claim 2, wherein at least one of the base stations can implement a plurality of wireless modulation schemes simultaneously through scheme multiplexing, and the one or more processors are configured to select a base station that can implement the implementation-scheduled wireless modulation scheme and in which there is at least one idle wireless system among the plurality of wireless modulation schemes to be implemented through scheme multiplexing during the scheduled implementation time period, from among the base stations included in the list.

6. The base station management apparatus according to claim 2, wherein the one or more processors are configured to select a base station that can implement the implementation-scheduled wireless modulation scheme during a scheduled time period for which a wireless terminal accommodated in the coverage area of the failed base station is to perform wireless communication, from among the base stations included in the list.

7. A computer program stored in a non-transitory computer readable storage medium for enabling a computer to function as the base station management apparatus according to claim 2.

8. The base station management method according to claim 1, wherein the selecting includes selecting a base station that is scheduled to implement the implementation-scheduled wireless modulation scheme during the scheduled implementation time period from among the base stations included in the list.

9. The base station management method according to claim 1, wherein, when the base stations in the list do not include a base station that is scheduled to implement the implementation-scheduled wireless modulation scheme during the scheduled implementation time period, the selecting includes selecting a base station that can implement the implementation-scheduled wireless modulation scheme and that is idle during the scheduled implementation time period, from among the base stations included in the list.

10. The base station management method according to claim 1, wherein at least one of the base stations can implement a plurality of wireless modulation schemes simultaneously through scheme multiplexing, and the selecting includes selecting a base station that can implement the implementation-scheduled wireless modulation scheme and in which there is at least one idle wireless system among the plurality of wireless modulation schemes to be implemented through scheme multiplexing during the scheduled implementation time period, from among the base stations included in the list.

11. The base station management method according to claim 1, wherein the selecting includes selecting a base station that can implement the implementation-scheduled wireless modulation scheme during a scheduled time period for which a wireless terminal accommodated in the coverage area of the failed base station is to perform wireless communication, from among the base stations included in the list.

* * * * *